No. 659,128. Patented Oct. 2, 1900.
A. B. BROWN.
STEERING MECHANISM FOR SHIPS.
(Application filed Mar. 13, 1900.)
(No Model.) 2 Sheets—Sheet 1.
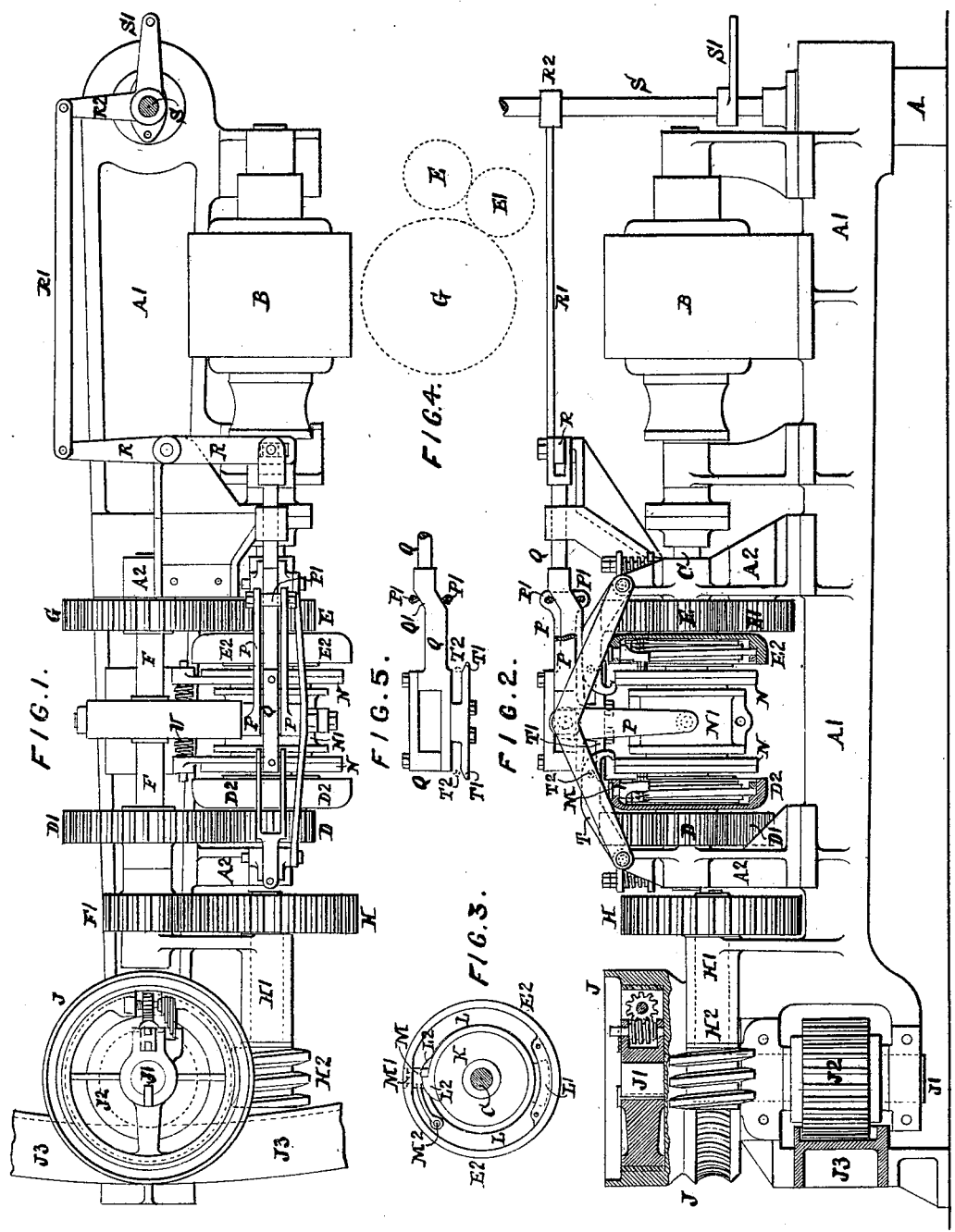
WITNESSES:
F. W. Wright.
Walter Abt.
INVENTOR
ANDREW B. BROWN
BY Howson and Howson
HIS ATTORNEYS.

No. 659,128. Patented Oct. 2, 1900.
A. B. BROWN.
STEERING MECHANISM FOR SHIPS.
(Application filed Mar. 13, 1900.)
(No Model.) 2 Sheets—Sheet 2.
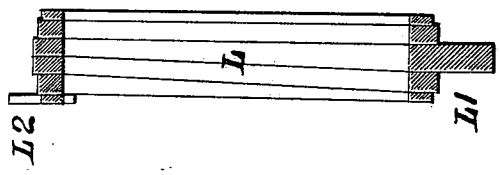
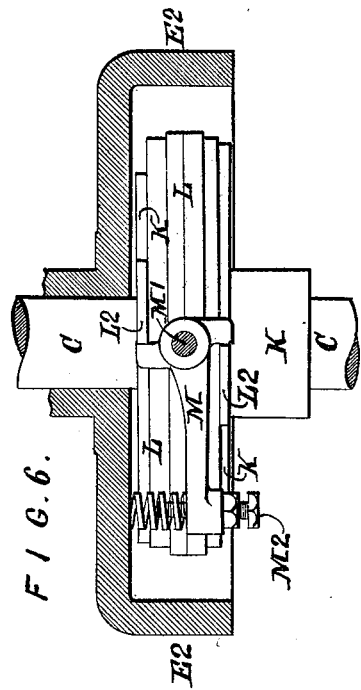
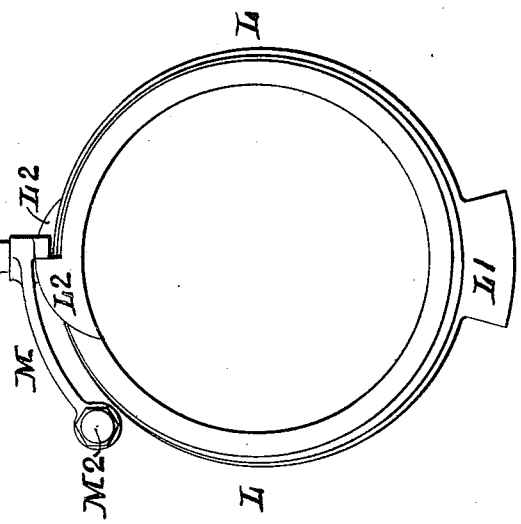
WITNESSES
Walter Abbe
S. C. Connor
INVENTOR
Andrew B. Brown
BY
Howson and Howson
ATTORNEYS

UNITED STATES PATENT OFFICE.

ANDREW BETTS BROWN, OF EDINBURGH, SCOTLAND.

STEERING MECHANISM FOR SHIPS.

SPECIFICATION forming part of Letters Patent No. 659,128, dated October 2, 1900.

Application filed March 13, 1900. Serial No. 9,039. (No model.)

*To all whom it may concern:*

Be it known that I, ANDREW BETTS BROWN, a subject of the Queen of Great Britain and Ireland, and a resident of Edinburgh, Scotland, have invented a new and useful Electric Tiller or Improved Steering-Machine, of which the following is a specification.

According to my invention a tiller fixed to the rudder-head of a ship carries an electric motor and gearing for driving a pinion which gears with a toothed arc-shaped rack fixed to the deck. The electric motor drives a shaft continuously in one direction at a comparatively-rapid rate and when required acts through one or other of two clutches on the gearing, which moves the tiller in the required direction. The clutches are controlled by a bell-crank lever acted on by a sliding piece, which is moved by means of suitable apparatus from a bridge or other steering-station.

In the accompanying drawings, Figure 1 is a plan, and Fig. 2 is a side elevation, of the improved apparatus, and Figs. 3, 4, and 5 are detail views hereinafter referred to, while Figs. 6, 7, and 8 are enlarged views of the coil-clutch.

In the drawings the same reference-letters are used to mark the same or like parts wherever they are repeated.

The rudder-head A has fixed on it a tiller or tiller-frame A', which is by preference made of steel and which has fixed upon it an electric motor B, which may be of any known suitable kind. The motor-shaft C is supported in bearings in frame-pieces A², fixed to the tiller A', and has loose on it two pinions D E, one, D, gearing directly with a spur-wheel D' on a shaft F and the other gearing with an intermediate pinion E', which gears with another spur-wheel G of the shaft F, as diagrammatically indicated in Fig. 4, the arrangement constituting a well-known device for obtaining opposite rotations from a shaft turning in one direction only.

The shaft F, carried in bearings in the frame-pieces A², has fast on it a pinion F', which gears with a spur-wheel H on a short shaft H', having on it a worm H², gearing with a worm-wheel formed on or fixed to a clutch-box J. The construction of the clutch details forms no part of my present invention.

The clutch acts on a vertical shaft J', a pinion J² on which gears with a toothed arc-shaped rack J³, fixed to the deck.

The pinions D E on the motor-shaft C have each formed in the same piece with or fixed to it a clutch-piece D² E², forming the outer part of what is known as a "coil-clutch," the inner part of such clutch being in each case a disk K, fixed on the shaft C. (Shown in Fig. 3.) The coil L of each clutch is fixed by its middle to the outer clutch-piece, as shown at L', Fig. 3, and the ends of the coil are formed with hook-like tails L², Figs. 6, 7, and 8, which are acted on by projections on a lever M, centered on a pin M' and made with an arm, in the end of which is a screw-pin M² for accurate adjustment. When the lever M is pressed by the endwise movement of the block N, Fig. 2, it makes the coil L grip the disk K, which is fast on the shaft C, and then the shaft drives the pinion D or E, the clutch of which is thus put into gear, the movement for causing the clutch to act being extremely small.

On the shaft C there is carried a block N, made with end disks to act on the lever M of either clutch, and this block is itself movable by a block N', working between flanges on it, but with a little play or space, so as when in its middle position not to bear on either flange. The block N' is movable by a bell-crank lever P, (or pair of levers acting as one,) having nearly-vertical and nearly-horizontal arms, and in the horizontal arms there are fixed upper and lower knife-edges P', which are acted on by a horizontally-guided bar Q, (shown separately in Fig. 5,) made with opposite upper and lower inclines Q'. When the bar Q is moved longitudinally, the upper or lower incline Q' acting on the knife-edge P' moves the lever P in one direction or the other accordingly as the bar is moved forward or rearward. The bar Q is moved by a lever R, which is connected by a link R' to a lever R² on a vertical shaft S, turnable independently of but coaxial with the rudder-stock, and a lever S' on the vertical shaft is to be connected to telemotor or other apparatus arranged in any well-known manner, whereby the lever can be placed in a position corresponding to that in which it is required to place the rudder. When the bar Q is in its middle neutral position, the lever S' is parallel to the rudder, and on the lever S' being moved to either side the consequent movement of the tiller and rudder brings the parts into parallelism again, and thereupon the movement stops.

When the block N is moved to the left or the right, Fig. 2, to act on the corresponding lever M to make the coil L grip the disk K, Fig. 3, and so put that clutch into gear, it is held by a pair of catches T to insure the clutch being kept in gear until the required movement of the rudder is completely accomplished, and on that being done the bar Q returns to its middle position and an inclined projection T' on it strikes a pin T² on the catches and releases the block N, which is then returned to its inactive position by a spring V.

What I claim is—

An electric tiller consisting of the following parts in combination, namely, a tiller fixed to the rudder-head and carrying the other parts, an electric motor, a continuously-rotating shaft driven by the motor, two pinions on the shaft one directly gearing with a spur-wheel on a second shaft and the other driving an intermediate pinion which gears with another spur-wheel on the said second shaft, gearing between the said second shaft and a pinion which gears with a toothed rack fixed to the deck, clutches on the motor-shaft for engaging with either pinion on that shaft, a bell-crank lever to act on the clutches, a bar with inclines to act on knife-edges on the bell-crank lever to move that lever, the said bar being connected to a lever on a vertical shaft coaxial with but independent of the rudder-stock, and means to move the said vertical shaft correspondingly with the desired movement of the rudder, the several parts being arranged and operating substantially as herein set forth.

In testimony whereof I have signed my name to this specification in the presence of two subscribing witnesses.

ANDREW BETTS BROWN.

Witnesses:
PETER McLEOD,
J. D. McCULLOCH.